United States Patent [19]

Selig et al.

[11] Patent Number: 5,124,401
[45] Date of Patent: Jun. 23, 1992

[54] FINELY-DIVIDED VINYL CHLORIDE-ETHYLENE COPOLYMERS STABILIZED BY PROTECTION COLLOIDS

[75] Inventors: Manfred Selig; Joachim Schulze, both of Burghausen; Peter Ball, Emmerting; Klaus Marquardt; Manfred Hannebaum, both of Burghausen, all of Fed. Rep. of Germany

[73] Assignee: Wacker-Chemie GmbH, Fed. Rep. of Germany

[21] Appl. No.: 149,176

[22] Filed: Jan. 27, 1988

Related U.S. Application Data

[63] Continuation of Ser. No. 923,294, Oct. 27, 1986, abandoned.

[51] Int. Cl.$^5$ .............................................. C08K 11/02
[52] U.S. Cl. ................................... 524/834; 523/223
[58] Field of Search ............................... 524/834, 223

[56] References Cited

U.S. PATENT DOCUMENTS

| | | | |
|---|---|---|---|
| 3,423,351 | 1/1969 | Pierce | 524/832 |
| 3,830,761 | 8/1974 | Lenney | 524/834 |
| 4,226,752 | 10/1980 | Erickson | 524/460 |

FOREIGN PATENT DOCUMENTS

| | | |
|---|---|---|
| 0076511 | 4/1983 | European Pat. Off. . |
| 0099463 | 2/1984 | European Pat. Off. . |
| 1520849 | 3/1971 | Fed. Rep. of Germany . |

*Primary Examiner*—Joseph L. Schofer
*Assistant Examiner*—Peter D. Mulcahy
*Attorney, Agent, or Firm*—Bierman and Muserlian

[57] ABSTRACT

A finely-divided, monomodal protective-colloid stabilized aqueous dispersion of a copolymer of at least 75% by weight of units of vinyl chloride and ethylene and optionally copolymerized with up to 25% by weight of units of additional monomers unsaturated at the ethylene bond and having a solids content of 45 to 70% by weight, characterized in that the dispersions are not partially flocculated, the polymer has a mean particle size of 150 to 500 nm measured as mean weight in a disc centrifuge and a polydispersion index of not more than 1.8 and less than 50% of the polymer particles are larger than 1,000 nm and a process for the preparation thereof using a single step radical polymerization of vinyl chloride, ethylene and optionally additional monomers such as vinyl esters useful as dispersion powders, adhesives, binders and concrete additives.

8 Claims, 6 Drawing Sheets

FINELY-DIVIDED VINYL CHLORIDE-ETHYLENE COPOLYMERS STABILIZED BY PROTECTION COLLOIDS

PRIOR APPLICATION

This application is a continuation of copending U.S. patent application Ser. No. 923,294 filed Oct. 27, 1986, now abandoned.

STATE OF THE ART

Finely divided, aqueous polymer dispersions of copolymers of vinyl halide, ethylene and optionally additional comonomer units are known in principle, but not finely divided, non-flocculated, monomodal protective-colloid-stabilized polymer dispersions, preferably dispersions stabilized by polyvinyl alcohol with a basic resin consisting of at least 75% by weight, preferably at least 85% by weight, of vinyl chloride and ethylene units. Of special significance for many applications of dispersions is, in addition to the finely divided state, the absence of partially flocculated aggregates. The absence of partially flocculated aggregates can be established unequivocally in this case with the disc centrifuge, whereas electron microscope pictures are unsuitable for this purpose.

The preparation of aqueous dispersions of copolymers from the monomers mentioned above by emulsion polymerization is also known in principle. The substances necessary for the stabilization of such dispersions such as emulsifying agents and/or protective colloids usually are charged as starting materials (cf. EP-B-590 ≙ U.S. Pat. No. 4,189,415, DE-B 1,180,133 ≙ British Patent No. 1,356,143 and DE-A-1, 770,395 ≙ U.S. Pat. No. 3,816,363). However, there are also known processes in which the polymerization begins in the absence of an emulsifying agent or a protective colloid, and where these substances as well as part of the monomers are gradually added over the course of the polymerization (DE-B-1,520,849 ≙ British patent No. 991,536 ≙ DE-A 2,837,992 and U.S. Pat. No. 4,247,438 as well as DE-A 3,227,090 ≙ U.S. Pat. No. 4,528,315.

But each of these suggested processes has the disadvantage that the onset of the reaction as well as the timely onset of the various metered additions under practical conditions are often difficult to control. This causes many problems for the adherence to important quality requirements of the application technology. Mentioned as examples are compatiblity with cement, behavior of the polymer film in water, the screening rejection due to the content of coarse particles in the dispersions and other properties controlled by the particle size or the particle size distribution such as viscosity and shear stability.

Another frequently observed deficiency of the above-mentioned processes consists of the relatively long polymerization times. For example, the average polymerization time of the process examples disclosed in the DE-A-3,227,090 for pressure dispersions exceeds 14 hours although, this disclosure claims "short" polymerization times as an advantage of the process. In contrast, the typical polymerization time of the process of the present invention is between 7 and 8 hours.

OBJECTS OF THE INVENTION

It is an object of the invention to provide novel improved finely divided aqueous polymer dispersions of copolymers of vinyl halide and ethylene free of partially flocculated aggregages having improved properties.

It is another object of the invention to provide a very quick process for the preparation of the said aqueous dispersions having improved properties.

It is a further object of the invention to provide improved adhesives, concrete additives and textile binders.

These and other objects and advantages of the invention will become obvious from the following detailed description.

THE INVENTION

The novel products of the invention are a finely-divided, monomodal protective-colloid stabilized aqueous dispersion of a copolymer of at least 75% by weight of units of vinyl chloride and ethylene and optionally copolymerized with up to 25% by weight of units of additional monomers unsaturated at the ethylene bond and having a solids content of 45 to 70% by weight, characterized in that the dispersions are not partially flocculated, the polymer has a mean particle size of 150 to 500 nm measured as mean weight in a disc centrifuge and a polydispersion index of not more than 1.8 and less than 50% of the polymer particles are larger than 1,000 nm.

The novel process of the invention for the preparation of the copolymer dispersions of the invention comprises emulsion polymerizing a) 1 to 40% by weight of ethylene and b) 60 to 99% by weight of at least one comonomer liquid under the reaction conditions consisting essentially of b1) 60 to 100% by weight of vinyl chloride, b2) 0 to 40% by weight of an oil-soluble monomer unsaturated at the ethylene bond and copolymerizable with a) and b1) and free of any additional functional groups reactive under the reaction conditions and b3) 0 to 10% by weight of monomers unsaturated at ethylene bond and functional groups and/or ethylenically polyunsaturated in an aqueous medium with a radical initiator system in the presence of a protective colloid and optionally an emulsifier of not more than 50% by weight of the total weight of protective colloid and emulsifier, characterized in that I) the starting material charge is water, not more than 4% by weight of protective colloid and not more than 10% by weight based on total weight of component b) of comonomer, II) that the earliest addition of the remaining comonomer component b) is simultaneous to the start of polymerization and the half-life of of the initator is less than 10 hours, III) the earliest addition of additional protective colloid and optional emulsifier is simultaneously with the start of polymerization and at the latest 60 minutes after the start of polymerization and IV) the polymerization is carried out at an ethylene presence of 10 to 150 bar (1 to 1.5 MPa) and a temperature of 30° to 100° C.

One of the advantages of the process of the invention are the very short and reproducible inhibition times of normally 3 to 4 minutes and not more than 5 minutes, i.e. the period from the addition of the initiator or from the beginning of the radical formation to the start of the actual polymerization reaction which is known that it can be delayed, e.g., by contamination of the protective colloid, the emulsifier, the monomers and other scavangers of the reaction mixture. Comparison batches carried out according to the process described in DE-A-3,227,090, in contrast, start with widely fluctuating inhibition times. The correct point in time for the beginning of the metering of the protective colloid or the monomer metering becomes very difficult to determine because of this and this leads to wide fluctuations in the quality of the final product (c.f. the examples marked A infra). Such fluctuations have a negative effect especially on a commercial-scale operation. Although the process claimed in the DE-A-3,227,090 offers considerable advantages in comparison to conventional manufacturing processes, one immediately recognizes the deficiencies of the process because of the absence of emulsifiers and/or protective colloids at the start of polymerization required there (e.g. with amounts of several tons of monomers used). Examples A infra illustrate the expected difficulties of this process which process is nonetheless suitable for special scientific studies on a liter scale but not when applied on a commerical scale operation.

In comparison to DE-A-3,227,090, the other extreme with respect to the charging of protective colloid and emulsifier agent as starting material are conventional polymerization processes for dispersions stabilized with protective collids. In each of these processes, at least a relatively large amount of the monomers and the protective colloid, or even all the protective colloid, is charged as starting material. Here, the long and fluctuating inhibition periods also known to the expert occur, on the one hand, with the dispersions claimed here based on vinyl chloride/ethylene copolymers and, on the other hand, the control of the reaction after the start of the reaction becomes difficult, even with careful adherence to all usually controllable boundary conditions.

While stable, but not finely divided dispersions in the sense of the present invention can be obtained in some of such batches, which are satisfactory also with regard to the processing parameters such as viscosity, the other, frequently predominant portion yields completely unsatisfactory results, e.g. scatter of important parameters such as viscosity in an uncontrollable manner despite identical formulation, i.e., the dispersions become highly dilutant or they coagulate.

Thus, dispersions based on copolymers based on vinyl chloride and ethylene can be prepared in principle according to the conventional processes, but these products lack in almost all instances the elementary prerequisites for a technical application since they do not meet the required spectrum of properties. In many cases, the amount of coarse particles or the screen oversize of the dispersion is too great and they cannot be reproduced in uniform quality under commercial manufacturing conditions with the necessary certainty.

These known interrelations are one of the important reasons for the infrequent commercial availability of plastic dispersions based on vinyl chloride and ethylene stabilized with protective colloid, especially PVOH-stabilized, despite their technically interesting spectrum of properties and their favorably priced raw material situation. These deficiencies have been surprisingly well solved with the dispersions of the invention which dispersions based on vinyl chloride and ethylene are stabilized by protective colloids and have a low screen oversize, over tailings and have the required spectrum of properties also with commercial dimensions and are characterized by a very uniform product quality. Another advantage of the preferred process of the invention is the short inhibition and polymerization times as well as the very good control of the reaction conditions.

Finely divided means dispersions that have a mean particle size (diameter), measured as mean weight in a disc centrifuge, of at least 150 nm and not more than 500 nm, preferably at most 400 nm and especially preferred at most 350 nm. Dispersions that have a maximum in the particle size distribution and have a polydispersion index of not more than 1.8 are called monomodal.

The disc centrifuge is an analytical instrument for the determination of the particle size distribution of very small particles manufactured and sold, e.g., by Joyce Loebl Ltd., Princesway, I.V.T.E., Gateshead NE 11 0UJ, England (GB). This method utilizes the strong forces in the centrifugal field of a disc-like hollow cylinder filled with the sample liquid and rotating at very high speeds. The action and evaluation of the disc centrifuge are described in detail in the operating instructions and application reports by Joyce Loebl.

The disc centrifuge is an established and widely used method for the determination of the particle size distribution of particles dispersed in liquids and the disc centrifuge measures the hydrodynamic radius of the particles in the dispersed state in the fluid and thus provides unequivocal information about possible associates and flocculates of individual particles. Dispersions of identical empirical compositions can have a completely different colloid chemical structure. An important point in this context is the formation of flocculate structures or their absence since this colloid chemical structure critically controls many important application technological properties of dispersions such as viscosity, setting power, wet abrasion resistance, to mention just a few. These structural differences turn seemingly "identical" dispersions into respectively exactly specifyable, individual systems of substances. Protective-colloid-stabilized polyvinyl ester dispersions known to date are typically intermediate to coarse-disperse and contain the polymer in the dispersed state mainly as flocculates.

Figure 5:
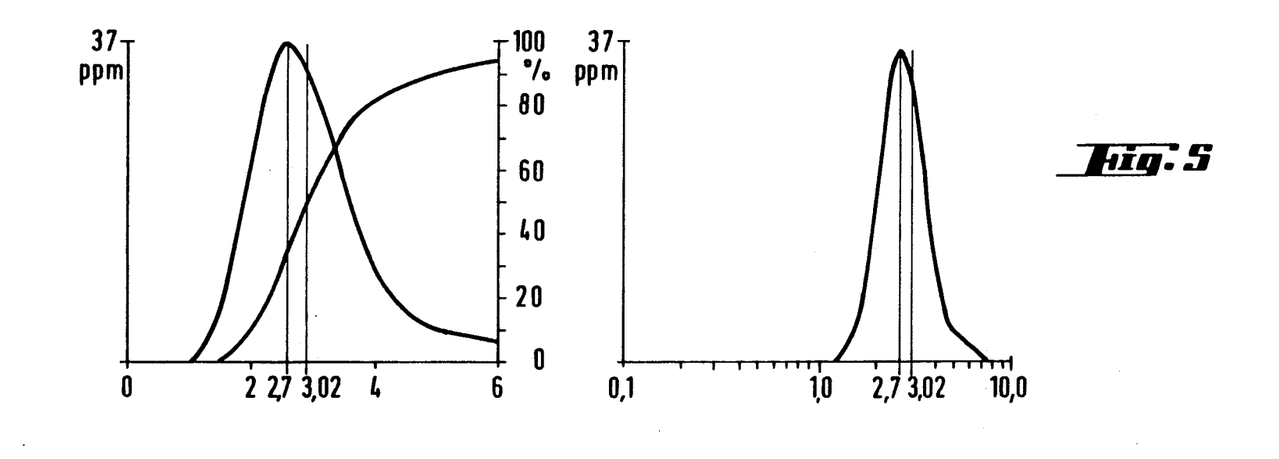
FIG. 5 is a disc centrifuge determination of a vinyl chloride-ethylene copolymer dispersion prepared by conventional method (Example B 1) plotted analogous to FIG. 1.
Figure 6:
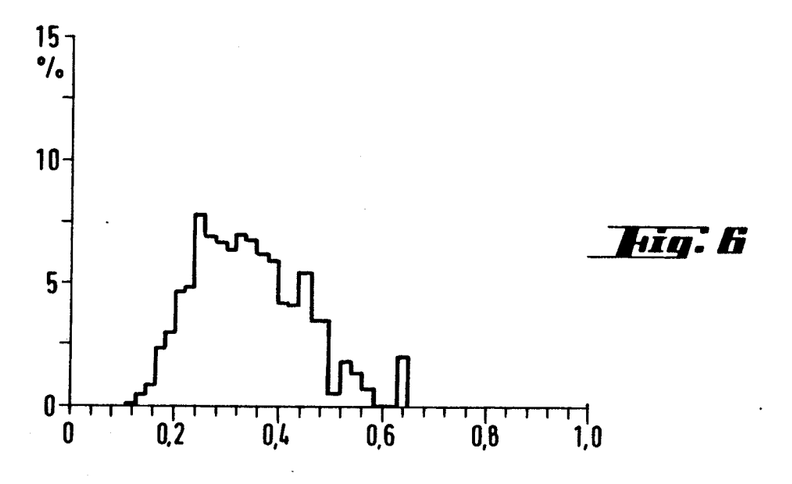
FIG. 6 is an evaluation of the electron microscope picture of the same dispersion as in FIG. 5.
Figure 7:
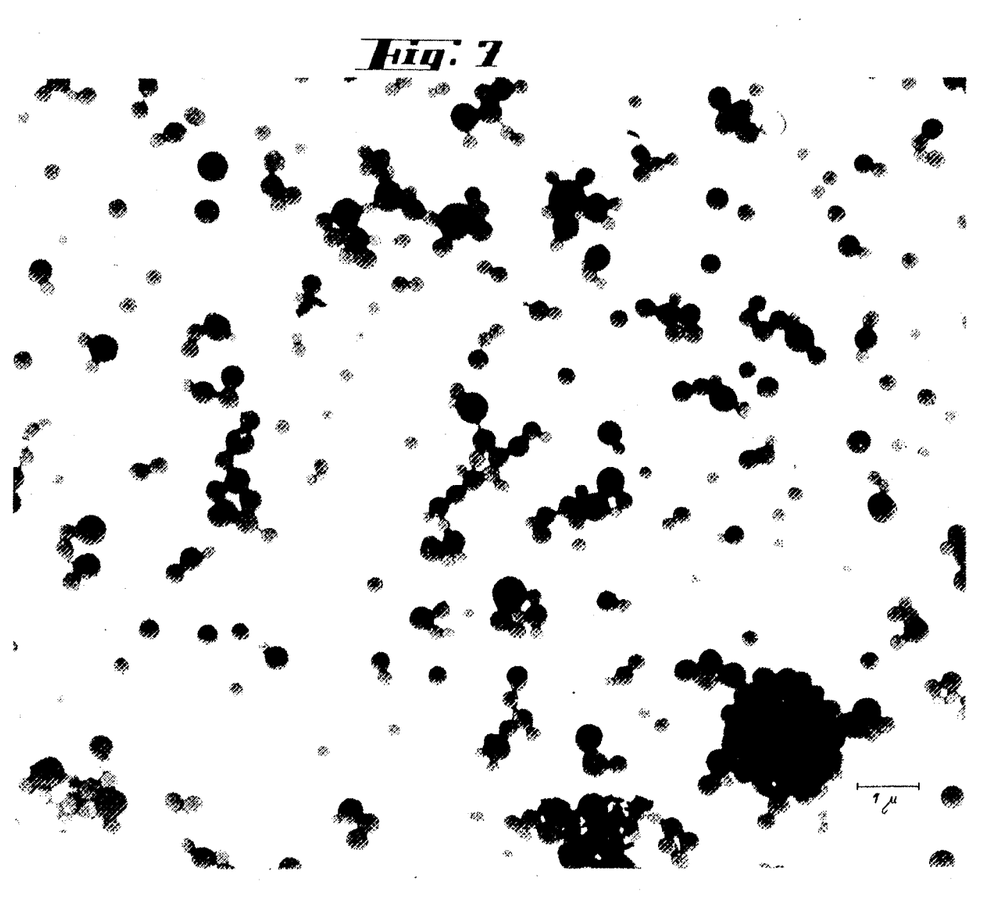
FIG. 7 is an electron microscope of the PVOH-stabilized VCE dispersion of FIG. 5 and FIG. 6.

Electron microscope pictures are not suitable since it always involves samples dried under ultra-high vacuum that naturally no longer permit any information about the degree of flocculation in the dispersed state and FIGS. 5, 6 and 7 illustrate these connections clearly. Whereas the electron microscope picture of the sample registers the individual particles at approx. 0.3 $\mu$m, the evaluation of the disc centrifuge recording showns that the dispersion itself is actually almost completely flocculated with particle sizes of about 3 $\mu$m. Thus electron microscopic pictures (EM pictures) not only are unsuitable for the description of flocculate conditions, but they frequenctly give rise to misinterpretations (cf. the EM-pictures FIGS. 2 and 3 or 6 and 7, resp., with the corresponding disc centrifuge evaluations FIGS. 1 and 5, resp.).

"Free of flocculates or partial flocculates" means a cumulative frequency of the particle size in the disc centrifuge in which less than 50% by weight, preferably less than 20% by weight, of the particles exceed 1,000 nm and this particle size limit lies preferably at not more than 700 nm, especially not more than 500 nm.

Figure 1:
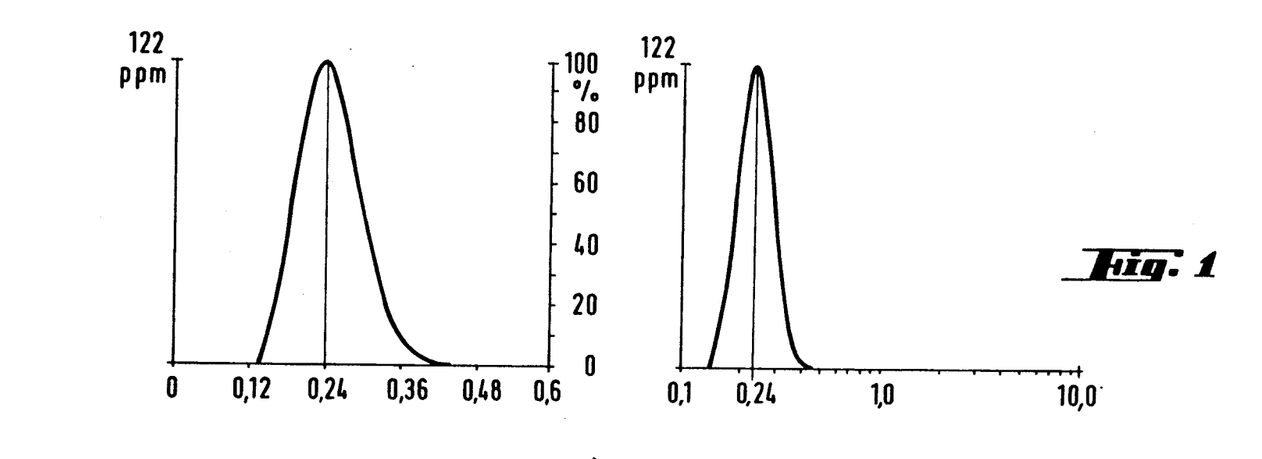
FIG. 1 describes particle size distribution (weight distribution curves) of the dispersion of Example C 11 measured with the disc centrifuge and plotted on two different scales of the particle diameters.
Figure 4:
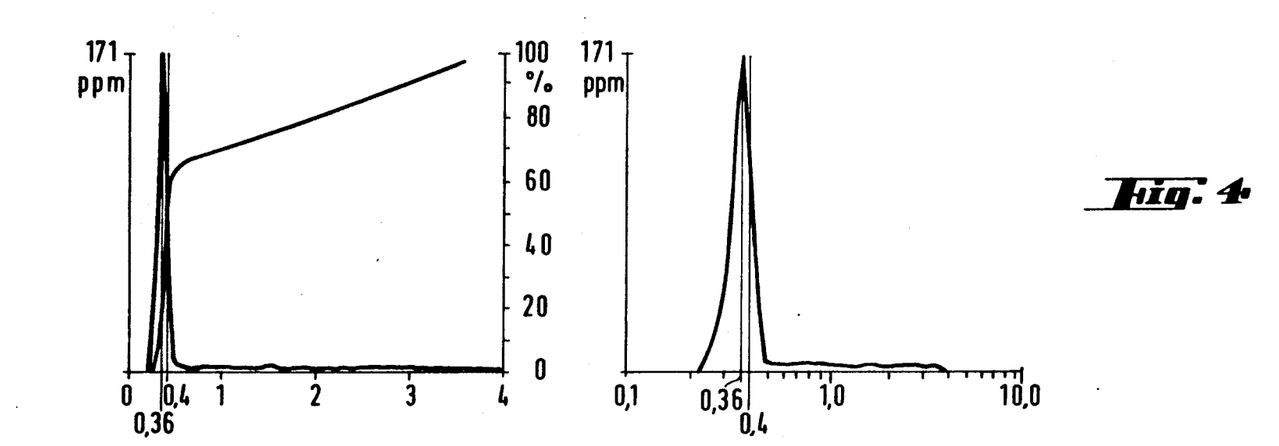

These correlations are explained graphically in FIG. 1. The at first inspection, high values for the admissibility of "coarse particles" result from the fact that in the cumulative frequency of the particle weights even minute contents of coarse particles cause a very strong shift in the cumulative frequency, although the content is numerically so small that it can actually be neglected. FIG. 4 illustrates this. The ratio of weight average to number average (the polydispersion index) of the disc centrifuge can be used as an additional parameter for the group of claimed substances. It is 1.8 at most, preferably 1.5 at most and especially preferred 1.3 at most.

For dispersions with monomodal particle size distribution, the NAON-SIZER ® of COULTER ELECTRONICS LTD., Harpenden, Herts, England (GB), is another instrument available for the determination of the particle size which is independent of the method of determination with the disc centrifuge, but particle size distributions cannot be obtained with the NANO-SIZER. With a polydispersion index (PD) of more than 2, the recording of a NANO-SIZER particle size loses its informative power. PO's>3 indicate fluocculates or bimodal distributions, but yield a "mean value" of the particle size in the determination with the NANO-SIZER ® which no longer has any information content.

The substances of the invention can be definitively characterized by the parameters shown above. Monomodal, finely dispersed PVOH-stabilized dispersions differ significantly in their colloid chemical structure, e.g., in their internal surface and therefore in their nature and their properties from the known, at least partially flocculated dispersions of identical or similar empirical composition (cf. e.g. FIG. 8).

A preferred, improved process for the preparation of such aqueous copolymer dispersions by emulsion polymerization of a) 1 to 40% by weight ethylene and
b) 99 to 60% by weight of at least one comonomer liquid under the conditions in an aqueous medium with a radical initiator system in the presence of a protective colloid and maximally 50% by weight, preferably at most 30% by weight and, especially preferred without emulsifier, (amount of emulsifier calculated with regard to the total amount of protective colloid and emulsifier) wherein the comonomer phase consists of b1) 60 to 100%, preferably at least 85%, more preferred at least 95%, especially 100% by weight of vinyl chloride.

b2) 0 to 40%, preferably not more than 15%, more preferred not more than 5% by weight of oil-soluble monomers unsaturated at the ethylene bond and copolymerizable with a) and b1), which contain, with the exception of the one ethylene bond double bond, no other functional groups active under the reaction conditions, and b3) 0 to 10%, by weight of functional monomers unsaturated at the ethylene bond and/or monomers polyunsaturated at ethylene bonds, is characterized by the polymerization being carried out in such a way that I. together with water and, if needed, at least a part of the usual additives such as drain transfer agents regulators, and buffer substances, not more than 4% by weight, preferably not more than 2.5% by weight, especially preferred not more than 1.2% by weight and particularly maximally 0.6% by weight, calculated with respect to the total weight of component b), of protective colloid, preferably PVOH, especially without any addition of emulsifier, in which case the charged amount of protective colloid and emulsifier is preferably not more than 40% by weight of the total amount of protective colloid used and, optionally, of emulsifier, and not more than 10% by weight, calculated with respect to the total weight of component b, preferably not more than 5% by weight and especially no comonomer at all are initially placed in the the reactor.

II. The addition of the remaining amount of comonomer component b begins at the earliest simultaneously with the possible start of the polymerization, which in the case of a redox initiation is understood to mean the presence of reducing and oxidizing component of the initiator system in the reaction vessel and for the case of thermal initiation, the reaching of an internal temperature in the reaction vessel by exogenous heating, at which the half-life of the initiator is less than 10 hours, preferably less than 5 hours.

III. The addition of additional protective colloid starts at the earliest simultaneously with and not later than 60 minutes after the possible start of polymerization and that the reaction is carried out IV. at an ethylene pressure of 10 to 150 bar, preferably of 30 to 80 bar, and temperatures of 30 to 100° C., preferably 45° C. to 80° C.

The claimed process is performed as an emulsion polymerization and all conventional additives such as emulsifier, protective colloids, initiators, reducing agents and regulators can be used in usual amounts for the emulsion polymerization. In this case, they may be added either to the starting materials or in portions or by a more or less continuous metering, as desired, unless it is excluded by the definition of the invention. However, the polymerization is performed preferably in the invention in the absence of emulsifier.

The polymerization is initiated by methods normally used for emulsion polymerization. Especially suitable are at least partially water-soluble, preferably completely water-soluble, inorganic or organic peroxide compounds such as peroxo compounds and hydroperoxides as well as water-soluble azo compounds. It is understood that the radical formation taking place in the aqueous phase is crucial for the emulsion polymerization (cf. Kirk-Othmer, Encyclopedia of Chemical Technology, 3rd edition, volume 18, pp. 742-743). The said peroxide initiators can also be combined with reducing agents in a well-known manner, if needed and such redox systems are preferred. Frequently, the known addition of small amounts of heavy metal compounds, e.g. iron-II-salts, is preferred.

The pH-range for the polymerization, which generally is between 2.5 to 10, especially 3 to 8, can be kept constant by a well-known method using suitable buffer systems, e.g. phosphate or carbonate buffer.

The ratio of charged to subsequently added protective colloid or emulsifier as well as the total amounts of these components may vary. Both quantities serve to obtain the technological application property spectrum required of the dispersion and may be adjusted according to these requirements. Usually, 0.1 to 4% by weight, preferably 0.3 to 1.2% by weight, of the protective colloid and, if needed, emulsifier are charged as starting material, calculated with respect to component b. Preferably, the protective colloid without emulsifier is charged and the total amount of protective colloid and emulsifier range from 5 to 18%; preferably from 7 to 13%; and especially from 8 to 12% by weight, calculated with respect to the component b).

The amount of emulsifier (calculated with respect to the total amount of protective colloid and emulsifier used) is at most 50% by weight, preferably not more than 30% by weight and in an especially preferred formulation, only protective colloid without emulsifier is used.

In the preferred practical example, the reaction vessel contains only water, a small amount of protective colloid, a small amount of an initiator component (generally 10 to 20% by weight, calculated with respect to the total weight of this initiator component) and optionally the salts necessary for the adjustment of the desired pH-value and for buffering and optionally catalytic amounts of salts of heavy metals prior to the start of the polymerization reaction. In a specific practical example, inert organic substances in total amounts of 0.1 to 15% by weight calculated with respect to the total weight of component b) may be added also to these starting materials. These inert organic substances possess water solubilities of $10^{-3}$ to 200 g per liter and molecular weight of not more than 1,000. Examples of suitable compounds are mentioned, for example, in the EP-A 76,511, and specific reference is made to the disclosure referring to this. Possible, but not preferred, is also the addition of comonomers in amounts of up to 10% by weight (calculated with respect to component b), especially up to 5% by weight of the starting materials.

The addition of the comonomer(s), i.e. component b, begins preferably not earlier than simultanelusly with the in-principle possible start of polymerization, e.g. at constant metering rate or preferably in relation to the consumption. Usually, the reaction is complete 60 to 180 minutes after the end of the metering of the comonomers.

The addition of the protective colloid not added as starting material and emulsifier begins also not earlier than simultaneously with and not later than 60 minutes after the possible start of polymerization. The metering of protective colloid or emulsifier and the metering of monomer do not have to begin or stop simultaneously, but protective colloid and emulsifier are preferably also metered in relation to their consumption in this case. In a preferred practical example, the comonomers and protective collid and optional emulsifier are added in a premixed form, e.g. especially preferred as pre-emulsion.

In the process of the invention, the ethylene can be used preferably in part or entirely as starting material i.e., the intended ethylene pressure can be built up during the course of the polymerization, however not later than the complete polymerization of the starting material, or by obtaining a conversion corresponding to the starting material, preferably not later than at the beginning of the comonomer metering. The ethylene pressure can be varied, i.e. increased and/or decreased, at will within the mentioned limits during the polymerization, optionally also several times. Preferably, however, it is kept constant during most of the time of comonomer metering. Subsequently, the addition of ethylene is preferably stopped.

Especially vinyl chloride is to be mentioned as comonomer (component b), which accounts for at least 60% by weight, preferably at least 85%, especially at least 95% by weight, of component b). As additional comonomers that are oil-soluble and copolymerizable with ethylene and vinyl chloride can be mentioned (component b 2) esters with unsaturated ethylene bonds such as allyl and preferably vinyl esters of carboxylic acids that are not unsaturated ethylenically, preferably saturated straight-chain, branched or cyclic, especially alkanoic acids of 1 to 20 carbon atoms such as vinyl acetate, vinyl propionate, vinyl butyrate, vinyl 2-ethylhexanonate, vinyl laurate, vinyl stearate, vinyl esters of highly branched carboxylic acids, which may be prepared, e.g., by the so-called Koch synthesis from olefins and carbon monoxie (so-called Versatic ® acid vinyl esters) such as mono- and dialkyl esters of carboxylic acids unsaturated at the ethylene bond, especially those from alcohols of 1 to 18, preferably 1 to 8 carbon atoms, with $\alpha,\beta$-unsaturated monocarboxylic acids of 3 to 8 carbon atoms such as methyl esters of acrylic, methacrylic and crotonic acid, the ethyl, propyl, butyl, 2-ethylhexyl, lauryl and stearyl esters of these carboxylic acids, dialkyl esters of dicarboxylic acid of 4 to 10 carbon atoms unsaturated at the ethylene bond, e.g. the esters of the mentioned alcohols of 1 to 18 carbon atoms with maleic acid, fumaric acid, and itaconic acid, as well as $\alpha$-olefins, e.g. propylene, butylene, sytrene and vinyltoluene; vinyl ethers and vinyl ketones; vinyl halides such as vinyl fluoride and vinyl bromide; and vinylidene halides, e.g. vinylidene chloride.

Preferred are the mentioned esters, especially the vinyl esters, the esters of acrylic acid, methacrylic acid, maleic acid fumaric acid and the halogen derivatives of ethylene. Especially preferred are the mentioned esters. These monomers which are monounsaturated at the ethylene bond and do not enter into any further reactions, e.g. do not have any cross-linking effect, which can be used singly or as mixtures, are contained in the comonomer component b) in amounts of not more than 40% by weight, preferably not more than 15% by weight, especially not at all.

Further, other additional monomers copolymerizable with the other monomers can be contained in the comonomer component b) in amounts of 0 to 10% by weight. Such monomers are those that have functional groups or are polyunsaturated at the ethylene bonds. Preferred are the functional monomers. These are understood to include compounds that have in addition to an ethylene double bond also carboxyl (—COOH or —COO—), sulfonate, epoxide, hydroxyl or, if needed, amide radicals substituted by e.g., alkyl, hydroxyalkyl, alkoxyalkyl, alkanoyl, or alkanoylalkyl.

Examples of these are: acrylic acid, methacrylic acid, itaconic acid, fumaric acid and maleic acid, their alkali or ammonium salts, their glycidyl esters, their mono- or diamides, especially acrylamide and methacrylamide which can be mono- or disubstituted at the nitrogen by alkyl of 1 to 4 carbon atoms and/or by methylol which in turn, can also be etherified by alkyl or esterified with alkanoic acids, monoesters of the mentioned dicarboxylic acids with alkanols of 1 to 8 carbon atoms, vinyl and allyl sulfonates, mentioned previously.

As examples of polyunsaturated monomers are vinyl and allyl esters of unsaturated monocarboxylic acids of 3 to 8 carbon atoms, as well as mono- or divinyl and allyl esters of saturated or unsaturated dicarboxylic acids of 4 to 10 carbon atoms, triallyl cyanurate and di- and polyesters of $\alpha,\beta$-unsaturated carboxylic acids with polyfunctional alcohols.

Frequently such monomers of group b 3), especially those readily soluble in water such as the carboxylic acids, their salts and their amides and especially preferred the sulfonates are added preferably only in amounts of up to 2% by weight, since they are used to improve the stability of the dispersion. Monomers through which the later-cross-linking can occur such as N-methylol(meth) acrylamide frequently are added preferably in amounts up to 5% by weight. The mentioned figures in weight % are always calculated with regard to the total weight of the respective comonomer component b).

Preferred as comonomers are mixtures of vinyl acetate with vinyl chloride and especially vinyl chloride alone. An addition of water-soluble monomers is often superfluous and is therefore not made according to an especially preferred practical example.

The emulsifiers and protective colloids suitable for the process of the invention are known to the expert. In principle, almost all surface active substances are suitable for use in the emulsion polymerization. Technological application requirements, monomers used and reaction conditions determine the choice in the individual case. Emulsifier and protective colloid, especially PVOH without any emulsifier addition, are used in amounts of 0.5 to 15% by weight total, preferably of 3 to 10% by weight, calculated with respect to the monomers that are liquid at the reaction conditions (component b). When additionally, comonomers are used which are known to have a stabilizing effect on the dispersion (e.g. vinyl sulfonate), even the small addition of approx. 1 to 3% by weight protective colloid and emulsifier can give good results. The addition of protective colloid and of emulsifier as starting material is preferably not more than 40% by weight, more preferred not more than 25% by weight, especially not more than 10% by weight of the total amount of protective colloid and optional emulsifier.

The protective colloids are those generally used for polymerization such as cellulose derivatives or water-soluble polymers like partially saponified polyvinyl acetate (polyvinyl alcohol) or vinylpyrrolidone polymers. Preferred is polyvinyl alcohol with a degree of hydrolysis of 70 to 99.8 mol % (corresponding to a saponification number of approx. 10 to approx. 257), preferably 74 to 99.5 mol % (corresponding to saponification numbers of approx. 20 to approx. 240) and with a mean degree of polymerization of 200 to 300 (corresponding to a viscosity of a 4% by weight aqueous solution at 20° C. of approx. 3 to approx. 50 mPa.s.).

The use of mixtures of different protective colloids is possible such as mixtures of PVOH's of higher and lower viscosities or higher and lower saponification. Also possible is the addition of one or several of these protective colloids earlier in the process and one or several other(s) later. It is known that polymers generally have a certain band width in their composition, i.e., a given polyvinyl alcohol characterized by the properties above does not consist of a single molecular species only.

Although systems without emulsifiers are preferred, anionic and/or nonionic emulsifiers in amounts of not more than 50% by weight, preferably not more than 30% by weight and more preferably not more than 10% by weight, calculated with respect to the total amount of emulsifier and protective colloid, may be used as well, if needed.

A classification of emulsifiers acceptable for the process of the invention according to their chemical nature can be found, e.g. in Stache, "Tensid-Taschenbuch", pp. 159 ff., Müchen 1979.

If emulsifiers are to be used at all, especially the following types of anionic tensides are suitable for the emulsion polymerization process of the invention:
1. Alkyl sulfates, especially those with a chain length of 8 to 18 carbon atoms, alkyl and alkylaryl ether sulfates of 8 to 18 carbon atoms in the hydrophobic group and 1 to 40 ethylene oxide or propylene oxide units (EO- or PO-units).
2. Sulfonates, especially alkyl sulfonates of 8 to 18 carbon atoms, alkylaryl sulfonates of 8 to 18 carbon atoms, taurides, esters and semiesters of sulfosuccinic acid with monovalent alcohols or alkylphenols with 4 to 15 carbon atoms; if desired, these alcohols or alkylphenols can also be ethoxylated with 1 to 40 ethylene oxide (EO-) units.
3. Alkali and ammonium salts of carboxylic acids of 8 to 20 carbon atoms in the alkyl, aryl, alkylaryl or aralkyl.
4. Partial esters of phosphoric acid and their alkali and ammonium salts, especially alkyl or alkylaryl phosphates of 8 to 20 carbon atoms in the organic radical, alkyl ether or alkylaryl ether phosphates of 8 to 20 carbon atoms in the alkyl or alkylaryl and 1 to 40 EO-units.

Suitable nonionic tensides are especially
5. Alkylpolyglycol ethers, preferably with 8 to 40 EO-units and alkyl of 8 to 20 carbon atoms.
6. Alkylarylpolyglycol ethers, preferably with 8 to 40 EO-units and 8 to 20 carbon atoms in the alkyl and aryl.
7. Ethylene oxide/propylene oxide (EO/PO) block copolymers, preferably with 8 to 40 EO- or PO-units.

As mentioned above, the polymerization is initiated preferably with so-called redox initiator systems which generally consist of a combination of at least one peroxide compound and at least one reducing agent. One of these components can be charged entirely or partially as starting material, the other component and, if appropriate, the rest of the component partially used as starting material or, if appropriate, both components, are then metered during the course of the polymerization. Preferred is the charging of a small amount of the reducing component as starting material.

Generally, the reducing component is used in an amount of approx. 0.01 to approx. 0.5% by weight, preferably 0.3 to 0.5% by weight, and the oxidizing component in an amount of approx. 0.01 to approx. 2% by weight, preferably 0.03 to 0.8% by weight. Especially good results are often obtained when the molar ratio of oxidizing component to reducing component is between 0.5 and 4. When the polymerization is thermally initiated, the reducing agent can be omitted. The above percentages are calculated with regard to the respective total weight of component b).

Preferred examples of the oxidizing components are the following peroxide compounds: Ammonium and potassium persulfate, ammonium and potassium peroxidisulfate, hydrogen peroxide, alkylhydroperoxides such as tert-butyl hydroperoxide, peroxodiphosphates such as potassium, sodium and ammonium peroxodiphosphate. Instead of the peroxide compounds, azo compounds can also be used, e.g. azobisisobutyronitrile or azobiscyanovalerianic acid.

Preferred examples of the reducing component are compounds of sulfur in which the sulfur is not present in its formal degree of oxidation of +6. Especially mentioned are water-soluble sulfites and sulfoxylates such as alkali metal (Na, K) or zinc formaldehyde sulfoxylate or sodium and potassium sulfites and bisulfites. Frequently, the catalysis by the addition of traces of suitable salts of heavy metals, such as $Fe^{2+}$, is indicated. Suitable initiator systems are described, a.o., in "Fundamental Principles of Polymerization", G. F. Alelio, John Wiley and Sons Inc., New York, 1952, pp. 333 ff and in DE-B-11 33 130 ≙ U.S. Pat. No. 3,145,194).

The copolymers of the invention have preferably K-values (according to DIN 53 726, measured in THF/$H_2O$ 95:5) of 20 to 100, especially preferred 30 to 80, most especially 35 to 70. The minimum film forming temperatures generally are not more than 25° C., frequently not more than 0° C., depending on the ethylene content.

The polymer dispersions or polymers prepared according to the invention and containing mainly vinyl chloride and ethylene can find use in all areas for which the known co- and terpolymers of vinyl ester/vinyl chloride/ethylene are suitable. For example, the dispersions of the invention can preferably be used for the preparation of dispersion powders (redispersible powders), of wood glue, adhesives for paper, plastic foils or leather which are characterized by especially short reaction times, and as binders for textiles or as concrete additives.

The invention is explained with the following examples and comparison tests and the examples are separated into three groups, of which Group A describes tests that were performed according to DE-A-3,227,090 which examples should be compared especially with examples C8 to C12. Group B is used as comparison with other protective colloid-stabilized vinyl chloride/ethylene dispersions prepared by "classical" methods and in Group C, the claimed invention is explained further.

The polyvinyl alcohol used in the examples is described in leaflets of the company WACKER-CHEMIE GmbH, D-8000 Munich, (DE) generally used for their POLYVIOL ® types with the number preceding the slanted line identifing the viscosity in mPas (Höppler viscosity of a 4% solution, measured at 20° C.), the number following the slanted line being the saponification number (according to the consumption in mg of KOH/1 g of substance). The viscosity of the dispersions is recorded in mPas together with the measuring equipment used (BROOKFIELD viscosimeter or EPPRECHT rheometer) and the characterization of the shear gradient known to the expert (e.g. Bf 20 - Brookfield 20 rpm, Rheo C III=Epprecht, beaker C, measuring stage 3). Dose (1) etc. identifies the various metered additions of reaction partners and additives.

Unless otherwise explained, data in % always refers to the weight. Solutions are always aqueous solutions unless stated otherwise. The following abbreviations and trademarks are identified as follows:
APS = ammonium persulfate
VC = vinyl chloride
VAC = vinyl acetate
E = ethylene
KPS = potassium persulfate
Brüggolit ® = sodium formaldehyde sulfoxylate
Rongalit ® = sodium formaldehyde sulfoxylate
Arkopal ® N 230 = nonylphenylpolyglycol ether with approx. 23 EO-units
Genapol ® X 150 = isotridecanol etherified with approx. 15 EO-units
t-BHP = tert-butylhydroxyperoxide.

In the following examples there are described several preferred embodiments to illustrate the invention. However, it should be understood that the invention is not intended to be limited to the specific embodiments.

EXAMPLE A 1

1,300 g of completely demineralized water were placed in a 16 liter autoclave and the pH was adjusted to 3.7. The chamber was evacuated, the agitator set at 500 rpm, $N_2$ was introduced to rinse the autoclave which was evacuated again. Then, 362 g of VAC and 1,088 g of VC were added. The internal temperature regulator was set at 43° C. and ethylene was added to a pressure of 55 bar. Once equilibrium was established, Dose (1) (an 8% solution of APS) and Dose (2) (a 4% Brüggolit solution) were fed at a rate of 65 g/hour. Twenty minutes after the start of the reaction, which was difficult to observe, Dose (4) (a mixture of 1,430 g of water, 2,047 g of an 8.5% Polyviol ® W 28/70 solution, 26 g of a 25% vinyl sulfonate solution and 479 g of a 25% Arkopal ®-N-230 solution) was added over 6 hours at a rate of 660 g/hour. Starting at a solids content between 25% and 30%, a more exact reading was not possible because of the difficulty to control the operation. Dose (3) (1,335 g of VAC and 4,000 g of VC) were metered for 5.5 hours and the ethylene pressure was gradually increased to 60 bar over this time.

The pH was maintained between 3.6 and 4.0 by addition of ammonia and once the final solids content was reached, approx. 4-5 hours after the end of Dose (3), the pH was adjusted to 7.5 and the pressure was released from the reaction mixture and the residual monomers removed.

EXAMPLE A 2

Example A 1 was repeated in an identical manner.

EXAMPLE A 3

Example A 1 was repeated in an identical manner.

EXAMPLE A 4

Example A 1 was repeated with the following changes: 1,400 g of completely demineralized water, 7.5 g of VAC and 225 g of VC and 0.6 g of allyl methacrylate were placed in the reaction vessel. Dose (2) (a 5.5% Rongalite ® solution) was metered at a rate of 60 g/hour, Dose (3) consisted of 1,625 g of VAC, 4,875 g of VC and 13 g of allyl methacrylate. Their addition began 10 minutes after the onset of the reaction and lasted 5½ hours. Dose (4) was a mixture of 2,916 g of an 8.5% by weight Polyviol ® W 28/70 solution, 1,258 g of a 20% Polyviol ® G 04/140 solution and 200 g of water. Its addition began 10 minutes after the start of the reaction and lasted 5½ hours.

EXAMPLE A 5

Example A 4 was repeated in an identical manner.

EXAMPLE A 6

A 16 liter autoclave was charged with 900 g of water and 500 g of KPS and the pH value was adjusted to 3.5 and stirring was started. Then, the autoclave was evacuated, rinsed with nitrogen, again evacuated and a mixture of 322 g of VAC and 968 g of VC was fed in by suction. The temperature regulator was adjusted to 40° C. and ethylene was added to a pressure of 55 bar. After reaching temperature equilibrium, Dose (2) (a 1.5% Rongalit ® solution) was started at 50 g/hour. Twenty minutes after the start of the reaction, Dose (4) (a mixture of 2,700 g of an 8.5% Polyviol ® W 28/70 solution, 2,785 g of an 11% Polyviol ® M 13/140 solution and 65 g of a 30% solution of GENAPOL ® X 150) was metered at a rate of 620 g/hour over 9 hours. Starting one hour after the start of the reaction, Dose (3) (1.225 g of VAC and 3,675 g of vinyl chloride) was added over 8 hours at a rate of 600 g/hour. The pH was maintained between 3.5 and 4.0 during the reaction. After the completion of Dose (3), the metering of Dose (2) was continued until the same solids content was reached twice and after the pH was adjusted to 7, the pressure was released and the residual monomer was removed.

EXAMPLES A 7 TO A 9

Example A 6 was repeated in an identical manner and the stirring was reduced from 200 to 140 and 120 rpm respectively, in two trials.

The analyses of Examples A 1 to A 9 are recorded in Table I.

EXAMPLE A 10

A 16 liter autoclave was charged with 100 mg of ferroammonium sulfate, 1,990 g of water and 1,150 g of VC and the pH was adjusted to 4.5. The autoclave was evacuated and rinsed with nitrogen. After another evacuation, the temperature was increased to 50° C. and ethylene was added to a pressure of 65 bar. This pressure was kept constant to the end of metering component b), then the ethylene valve was closed. Shortly before heating, 100 ml of Dose (1) (a 3% t-BHP solution) were added. Five minutes after reaching ethylene equilibrium, Dose (1) and Dose (2) (a 3% RONGALIT ® solution) were started at 180 g/hour, respectively. Ten minutes after the start of the reaction, which was difficult to identify, but started approx. 30 minutes after the beginning of both metered additions, a sample for solids content was removed and it had a solids content of 13%. Then, the metered addition of a mixture of 1,150 g of water and 4,200 g of a 20% Polyviol ® G 04/140 solution was started [Dose (4), 900 g/hour]. Starting fifteen minutes later, Dose 3 (6490 g of VC) was added at a rate of 1,100 g/hour. Then, the conversion was kept constant by adjusting the metered additions of (1) and (2). After the completion of monomer addition, Dose (1) and Dose (2) were added to the end of the reaction. Then, the pressure was released and the dispersion was freed of residual VC by evacuation.

Example A 10 is identical to Example C 12 in its overall composition, but the process was adjusted to the conditions of DE-A-3,227,090 in Example 10. A 51%, relatively coarse, strongly spreading dispersion was obtained and its analyses are recorded in Table 2. The entire spectrum of characteristics for the dispersion did not meet the standards of the present invention.

EXAMPLE A 11

Example A 10 was repeated, but the beginning of additions (3) and (4) was moved to an earlier time to adjust to a more monomer-rich mode of operation than in comparison to Example A 10. However, the batch started poorly despite the addition of ferroammonium sulfate, i.e., only approx. 3 hours after the beginning of the initiator addition. Despite the more monomer-rich mode of operation, no product was obtained that had characteristics comparable to those of Example C 12 of the invention. The analyses of this also strongly dotted dispersion are also found in Table 2. The disc centrifuge pictures of Examples A 10 and A 11 that are not according to the invention and of Example C 12 of the invention are found in FIG. 8.

EXAMPLE B 1

This example is a "classical" version for the preparation of PVAL-stabilized vinyl ester dispersions and the quantitative composition again corresponded to Example C 12 of the invention. The method differed from the latter example in the following points: The entire amount of PVAL was charged as starting material and 15% of the total comonomer was charged as starting material while 85% was added by metering. The details of the run were carried out as follows:

A 16 liter autoclave was charged with 3,130 g of water and 4,200 g of a 20% Polyviol ® G 04/140 solution and after evacuation and rinsing with nitrogen, the evacuation was repeated. Then, 1,150 g of VC were added by suction and the stirrer was started. The temperature was raised to 50° C. and ethylene was added to a pressure of 68 bar and this pressure was kept constant until the end of the addition of the monomers. Then, the ethylene valve was closed and the pH value was adjusted to 4.3 and kept constant during the subsequent reaction. The reaction was started with the metered addition of a 3% t-BHP solution (Dose (1) at 150 g/hour and a 5% RONGALIT ® solution [Dose (2)] at 150 g/hour). Thirty minutes after the start of the reaction, Dose (3) (6,500 g of VC) was started at a rate of 1,100 g/hour. Subsequently, the course of the conversion was kept uniform by varying of Dose (1) and Dose (2) accordingly. At a solids content of approx. 46%, hydrostatic pressure was observed, a typical sign of a very deficient copolymerization of ethylene. The reaction was then stopped and even at this low solids content the DISC evaluation (FIG. 9) showed that the dispersion did not meet the quality standards.

EXAMPLE C 1

A 16 liter autoclave was charged with 237 g of a 15% polyviol ® M 05/140 solution, 2,680 g of completely demineralized water and 208 g of dioctyl sebacate (DOS) and the pH was adjusted to 4.2. The autoclave was evacuated and rinsed with nitrogen. After renewed evacuation, the temperature was raised to 50° C. and ethylene was added up to a pressure of 68 bar. This pressure was kept constant to the end of the metered addition of component b and then the ethylene valve was closed. Before the start of the reaction, 20 ml of a 5% Rongalit ® solution were also charged as starting material.

The metered additions of Dose (3) (vinyl chloride) at a rate of 1,300 g/hour, Dose (1) (4% t-BHP solution) at a rate 130 g/hour and Dose (2) (6% RONGALIT ® solution) at a rate of 150 g/hour were started simultaneously and addition of Dose (4) (a 15% Polyviol ® M 05/140 solution) at a rate of 1,000 g/hour was started 30 minutes later. The metered additions (3) and (4) lasted for 4.5 hours at a constant rate and metered addition (1) lasted for a total of 6.5 hours, and the rate of addition was of the latter gradually decreased depending upon the conversion. The reaction started within 8 to 10 minutes after the beginning of initiator addition. The pH was maintained between 3.8 and 4.2 by addition of ammonia and after the end of the metered addition of initiator, the batch was freed of residual vinyl chloride and ethylene by releasing the pressure and evacuating for one hour. The final dispersion had a solids content of 50.0% and the polymerization time was 6.5 hours.

EXAMPLE C 2

Example C 1 was repeated with the following changes: no DOS (Dioctylsebacate) was used, 3 g of sodium acetate were added to the charged starting material for buffering of the pH, the metered addition of Dose (4) consisted of 1,130 g of water, 2,830 g of a 20% solution of Polyviol® G 04/140 and 907 g of a 25% solution of a nonylphenylpolyglycol ether with approx. 23 EO-units (ARKOPAL® N 230). The final dispersion had a solids content of 53% and the polymerization time was 8.5 hours.

EXAMPLE C 3

Example C 1 was repeated with the following changes: in metered addition of Dose (4), the Polyviol® M 05/140 was replaced by Polyviol® M 05/180 and a 49.8% dispersion was obtained.

EXAMPLE C 4

Example C 1 was repeated with the following changes: in metered Dose (4), the Polyviol® M 05/140 was replaced by Polyviol® M 05/60 and a 49.4% dispersion was obtained.

EXAMPLE C 5

Example C 1 was repeated with the following changes: a 5.5% ammonium persulfate solution was used as Dose (1), the pressure was 82 bar, the internal temperature was 78° C. and Dose (2) was omitted without substitution.

EXAMPLE C 6

Example C 1 was repeated with the following changes: no DOS was in the charged starting material, a mixture of 6,450 g of VC and 1.140 g of VL (vinyl laurate) was used as Dose (3) and Dose (4) contained, in addition, 126 g of 30% vinyl sulfonate solution and 76 g of dibutyl maleinate.

EXAMPLE C 7

A 16 liter autoclave was charged with 724 g of a 20% Polyviol® G 04/140 solution, 731 g of an 8.5% Polyviol® W 28/70 solution and 1,510 g of completely demineralized water and the pH was adjusted to 4.5. The autoclave was evacuated and rinsed with nitrogen. After renewed evacuation, the temperature was raised to 45° C. and ethylene was added to a pressure of 60 bar. This pressure was kept constant until the end of the metered addition of component b) and then the ethylene valve was closed. Before the start of the reaction, 20 ml of a 5% RONGALIT® solution were also charged with the starting material. The metered addition of Dose (3) (a mixture of 1,380 g of vinyl acetate and 5,520 g of VC) at a rate of 1,100 g/hour, of Dose (1) (a 10% t-BHP solution) at a rate of 70 g/hour and of Dose (2) (a 10% RONGALIT® solution) at a rate of 70 g/hour were started simultaneously. Thirty minutes after the beginning of the said additions (the reaction had an induction period of approx. 15 minutes) metered Dose (4) (a mixture of 1,030 g of water, 1,690 g of a 20% Polyviol® G 04/140 solution, 1,700 g of an 8.5% Polyviol® W 28/70 solution, 431 g of a 48% N-methylol acrylamide solution and 34.5 g RONGALIT®) was started. Metered Dose (1) was reduced to 45 g/hour and varied over the subsequent course of the conversion; metered addition (2) was completed. Metered Dose (3) lasted for 7 hours, Dose (4) for 6.5 hours and Dose (1) for 8.25 hours. Then the pressure on the reaction batch was released and the residual vinyl chloride was removed by evacuating for one hour. A characterization of the dispersions obtained in Examples C 1 to C 7 is found in Table 3.

EXAMPLE C 8

A 600 liter autoclave was charged with 5.6 kg of a 20% Polyviol® G 04/140 solution and 52.8 kg of completely demineralized water and the pH was adjusted to 4.7. The autoclave was evacuated and rinsed with nitrogen. After renewed evacuation, the temperature was raised to 50° C. and ethylene was added to a pressure of 68 bar. This pressure was kept constant to the end of the metered addition of component b) and then the ethylene valve was closed. Before the start of the reaction, 7 kg of a 5% RONGALIT® solution were charged with the starting material. The metered Dose (3) (vinylchloride) was added at a rate of 28 kg/hour, (Dose (1) (4% t-BHP solution) at 4.8 kg/hour, Dose (2) (5% RONGALIT® solution) at 4.8 kg/hour and Dose (4) (a mixture of 117 kg of a 20% Polyviol® G 04/140 solution with 33.6 kg of water) at a rate of 19 kg/hour. During the polymerization, the Doses (3) and (4) were fed at a constant rate for 8 hours and Doses (1) and (2) lasted for a total of 9 hours. The metering rate was then adjusted according to the conversion to guarantee a uniform reaction. The pH was maintained between 4.5 and 4.7 by the metered addition of ammonia. After the end of the addition of the initiator, the pressure on the batch was released and residual vinyl chloride was removed by evacuating for one hour. The result is shown in Table 4.

EXAMPLES C 9 AND C 10

Example C 8 was repeated twice. The charged amount of water was only slightly varied which explains the somewhat different solids contents and viscosities. Table 4 shows the very good reproducibility and the determination with the disc centrifuge and the nano-sizer were within the limits of error.

EXAMPLES C 11 and C 12

Example C 8 was repeated and the amount of charged water was increased to 72 kg. The consumption of initiator was distinctly increased in comparison to Example C 8 which explains the lower minimum film-forming temperature (MFT). Example C 11 was then repeated on a 16 liter scale as Example C 12. No differences were found between Examples C 11 and C 12, although a scale adjustment by a factor of 50 had been made. In addition, the experimental equipment showed no geometrical similarities. The pertinent values are recorded in Table 4.

TABLE 1

| | Reproducibility of batches of DE-A-3,227,090. | | | | | |
|---|---|---|---|---|---|---|
| Example | Solids content | Bf1 | Bf20 | Structural factor | Settling | Comments |
| A1 | 55.6 | 8200 | 2160 | 1.96 | 0.8 | |
| A2 | 54.4 | 4000 | 1230 | 2.59 | 0.9 | |

TABLE 1-continued

Reproducibility of batches of DE-A-3,227,090.

| | | | | | | |
|---|---|---|---|---|---|---|
| A3 | 54.5 | 1240 | 566 | 0.87 | 1.6 | finely specked |

| Example | Reaction after minutes | Bf20 | | | | |
|---|---|---|---|---|---|---|
| A4 | 5 | dilutant | | | | |
| A5 | 15 | 8560 | | | | |

| Example | Agitation rpm | Solids contents | Bf 10 | Rheo CIII | Reaction after minutes | Final pressure |
|---|---|---|---|---|---|---|
| A6 | 200 | 52 | 17760 | 5300 | 90 | 65 |
| A7 | 200 | 48.6 | 35680 | 15476 | 30 | >90 |
| A8 | 140 | 45 | 13600 | 1281 | 120 | >90 |
| A9 | 120 | 48.7 | 10760 | 3274 | 60 | 62 |

TABLE 2

Examples A 10 and A 11 Dispersions according to the process of DE-A-3,227,090 and Example C 12 is according to the invention

| | Example | | |
|---|---|---|---|
| | A 10 | A 11 | C 12 |
| Solids content (%) | 51 | 52 | 51.3 |
| MFT (°C.) | 10.5 | 0 | 3 |
| K-value | — | — | 45 |
| Screen oversize (g/kg) 160 μm screen | 1.1 | 8.6 | 0.2 |
| Screen oversize (ppm) 60 μm screen | 110 | 129 | 42 |
| Bf 20 (mPa.s.) | 208 | 360 | 3800 |
| Structural factor | 0.44 | 0.7 | 3.1 |
| Disc weight average (μm) | 1.87 | 1.35 | 0.3 |
| Disc number average (μm) | 0.2 | 0.19 | 0.27 |
| Nano-sizer (μm) | 0.75 | 0.44 | 0.284 |
| PD | 5 | 6 | 1 |
| Comments | strongly specked | strongly specked | clear |

(ppm = mg/kg)
MFT = Minumum film finishing temperature

TABLE 3

Analytical characterization of the example group C 1–C 7

| | Example | | | | | | |
|---|---|---|---|---|---|---|---|
| | C1 | C2 | C3 | C4 | C5 | C6 | C7 |
| Solids content (%) | 50 | 53.3 | 49.8 | 49.4 | 50 | 54.4 | 52.2 |
| MFT (°C.) | 0 | 23 | 4 | 6 | 12 | 0 | 12 |
| K-value | 43 | — | 47 | 43 | 39 | — | 58 |
| Bf 20 (mPa.s.) | 1400 | 2250 | 840 | 460 | 2300 | 1046 | 6900 |
| Structural factor | 2.0 | 1.6 | 1.4 | 1.1 | 2.6 | 1.1 | 1.35 |
| Disc weight average (μm) | 0.39 | 0.31 | 0.61 | 0.46 | 0.39 | 0.49 | 0.64 |
| Disc number average (μm) | 0.36 | 0.29 | 0.42 | 0.46 | 0.25 | 0.48 | 0.36 |
| Nano-sizer (μm) | 0.35 | 0.28 | 0.47 | 0.55 | 0.27 | 0.58 | 0.50 |

TABLE 4

| | Example | | | | |
|---|---|---|---|---|---|
| | C8 | C9 | C10 | C11 | C12 |
| Autoclave volume (L) | 600 | 600 | 600 | 600 | 16 |
| Solids content (%) | 52.7 | 53.7 | 53.5 | 49.6 | 51.3 |
| MFT (°C.) | 9 | 9 | 7 | 2.5 | 3 |
| K-value | — | 47 | — | 46 | 45 |
| Screen oversize g/kg (160 μm screen) | 0.03 | 0.07 | 0.12 | 0.1 | 0.2 |
| Screen oversize ppm (60 μm screen) | 13 | 18 | 1 | 7 | 42 |
| Bf 20 (mPa.s.) | 4060 | 6340 | 6400 | 3120 | 3800 |
| Structural factor | 3.3 | 3.9 | 3.3 | 3.6 | 3.1 |
| Disc weight average (μm) | 0.29 | 0.27 | 0.31 | 0.25 | 0.3 |
| Disc number average (μm) | 0.24 | 0.23 | 0.23 | 0.22 | 0.27 |
| Nano-sizer (μm) | 0.306 | 0.283 | 0.265 | 0.281 | 0.284 |
| PD | 1 | 1 | 2 | 1 | 0 |

Referring now to the Figures.

| P. Diameter (μm) | | |
|---|---|---|
| MEAN: | WEIGHT: | 0.25 μm |
| | NUMERICAL: | 0.22 μm |
| MAXIMUM: | WEIGHT: | 0.25 μm |
| | NUMERICAL: | 0.21 μm |
| SPEC. SURFACE: | | 20.532 m²/g |

Figure 2:
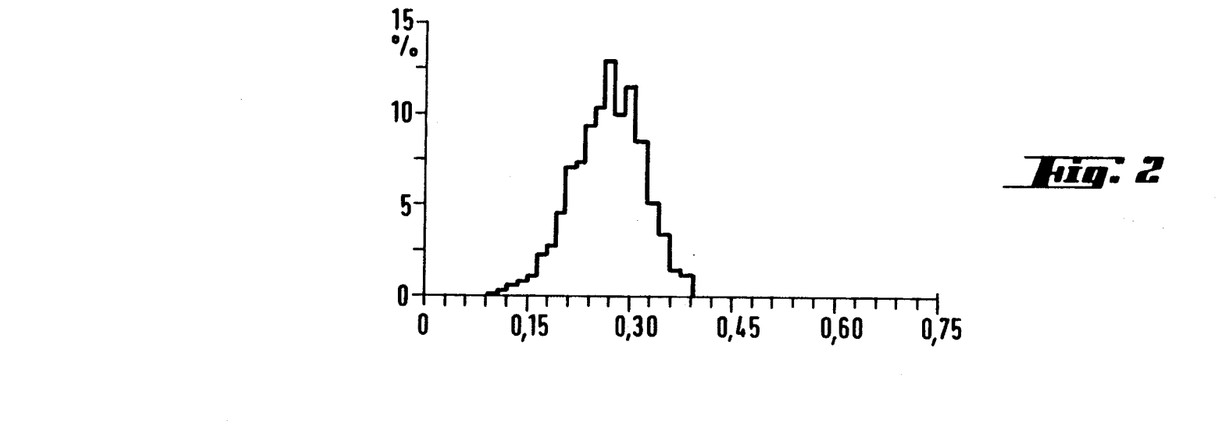
FIG. 2 is an evaluation of the electron microscope pictures of the dispersion of Example C 11.
Figure 3:
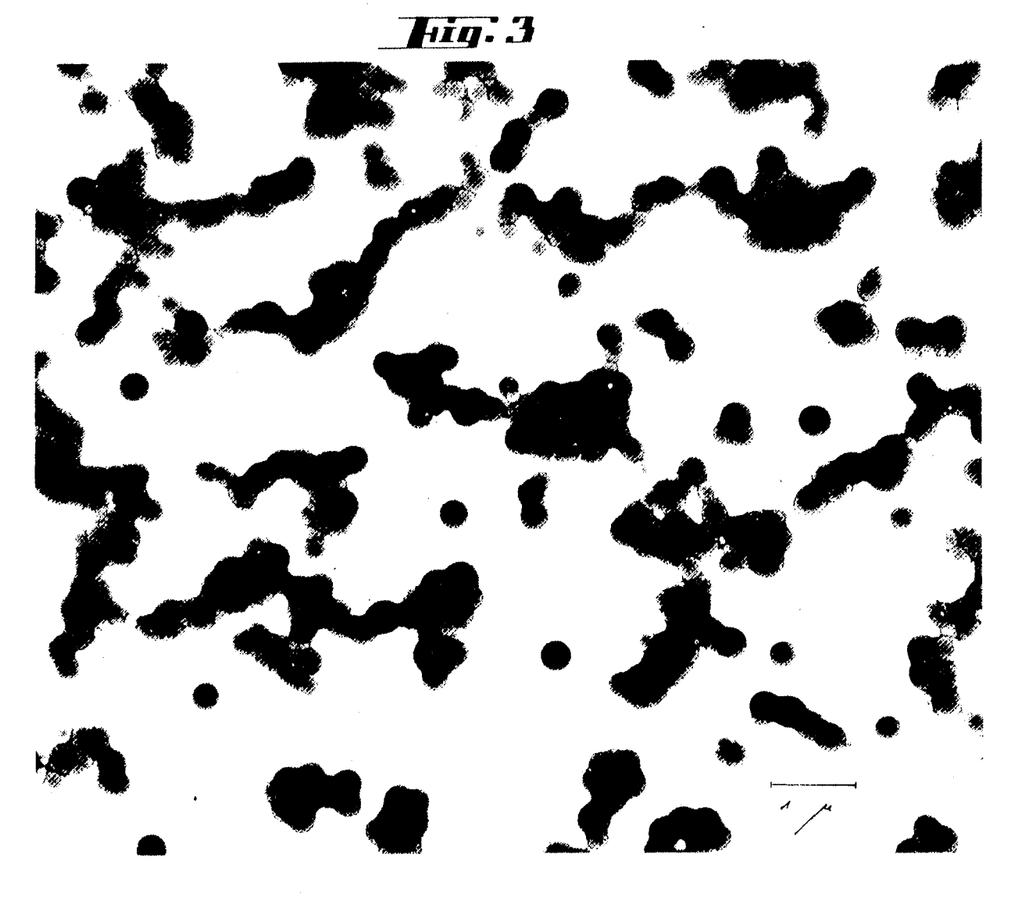
FIG. 3 is an electron microscope picture of the dispersion of Example C 11 and FIG. 4 is a Disc centrifuge determination of a vinyl chloride-ethylene copolymer dispersion of Example C 1 plotted analogous to FIG. 1.

| VOLUME DISTRIBUTION | DIAMETER DISTRIBUTION | |
|---|---|---|
| .251 | interval width | 0.15 |
| maximum .285 | mean | .235 |
| | maximum | .225 |
| | distribution from | .06 to .39 |
| | sigma | .064 |

| WEIGHT DISTRIBUTION CURVE | | |
|---|---|---|
| MEAN: | WEIGHT: | .40 μm |
|  | NUMBERS: | .35 μm |
| MAXIMUM: | WEIGHT: | 36 μm |
|  | NUMBERS: | .36 μm |
| SPEC. SURFACE: | | 10.269 m²/g |

| WEIGHT DISTRIBUTION CURVE | | |
|---|---|---|
| MEAN: | WEIGHT: | 3.83 μm |
|  | NUMBERS: | 2.36 μm |
| MAXIMUM: | WEIGHT: | 2.71 μm |
|  | NUMBERS: | 2.22 μm |
| SPEC. SURFACE: | | 1.651 m²/g |

| VOLUME DISTRIBUTION | DIAMETER DISTRIBUTION | |
|---|---|---|
| mean .289 | interval width | .02 |
| maximum .26 | mean | .26 |
|  | maximum | .26 |
|  | distribution from | 0.08 to .64 |
|  | sigma | .069 |

Figure 8:
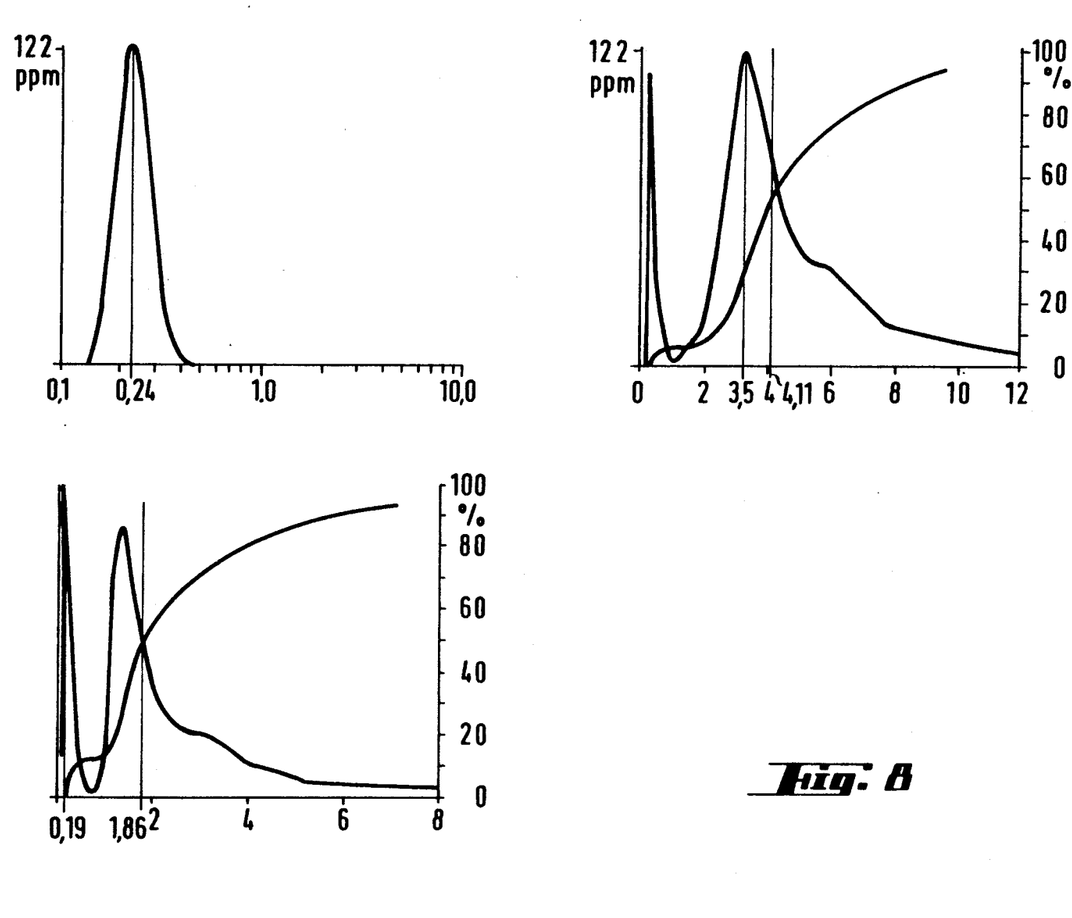
FIG. 8 is a comparison of the particle size distributions of the dispersions of Examples C 12, A 10 and A 11 plotted analogous to FIG. 1.

| EXAMPLE C 12 | | EXAMPLE A 10 | | EXAMPLE A 11 | |
|---|---|---|---|---|---|
| $MW_{weight}$ | 0.25 μm | $MW_{weight}$ | 1.35 μm | $MW_{weight}$ | 1.87 μm |
| $MW_{number}$ | 0.22 μm | $MW_{number}$ | 0.19 | $MW_{number}$ | 0.2 μm |
| Spec. surface | 20.5 m²/g | Spec. surface | 6.042 m²/g | Spec. surface | 4.5 m²/g |

Figure 9:
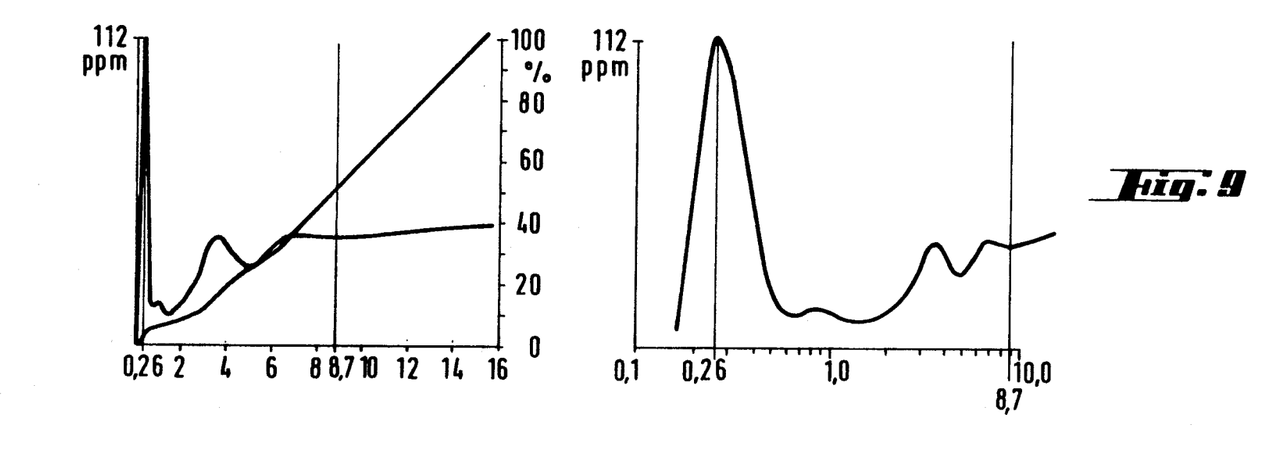
FIG. 9 is a particle size distribution of the dispersion of Example B 1 plotted analogous to FIG. 1.

| MEAN: | WEIGHT: | 8.70 μm |
|---|---|---|
|  | NUMBERS: | .25 μm |
| MAXIMUM: | WEIGHT: | .27 μm |
|  | NUMBERS: | .22 μm |

| -continued | |
|---|---|
| SPEC. SURFACE: | 1.540 m²/g |

Various modifications of the products and process of the invention may be made without departing from the spirit or scope thereof and it should be understood that the invention is intended to be limited only as defined in the appended claims.

What we claim is:

1. A finely-divided, monomodal protective-colloid stabilized aqueous dispersion of a copolymer of at least 75% by weight of units of vinyl chloride and ethylene and copolymerized with up to 25% by weight of units of additional monomers ethylenically unsaturated and having a solids content of 45 to 70% by weight, characterized in that the dispersions are free of flocculated, the polymer has a mean particle size of 150 to 500 nm measured as mean weight in a disc centrifuge and apolydispersion index of not more than 1.8 and less then 50% by weight of the polymer particles are larger than 1,000 nm.

2. A finely-divided, monomodal protective-colloid stabilized aqueous dispersion of a copolymer of a) 1 to 40% by weight of ethylene and b) 60 to 99% by weight of comonomer phase comprised of b1) 60 to 100% of vinyl chloride, b2) 0 to 40% by weight of an oil-soluble monomer ethylenically unsaturated and copolymerizable with a) and b1) and free of any additional functional groups reactive under the reaction conditions, and b3) 0 to 10% by weight of monomers ethylenically unsaturated and having a functional group and/or is ethylenically polyunsaturated having a solids content of 45 to 70% by weight, characterized in that the dispersions are free of flocculation, polymer has a mean particle size of 150 to 500 nm measured as mean weight in a disc certrifuge and a polydispersion index of not more than 1.8 and less than 50% of the particles are larger than 1,000 nm.

3. A dispersion of claim 2 wherein monomer b1) is at least 95% by weight of vinyl chloride.

4. A dispersion of claim 2 wherein monomer b1) is 100% of vinyl chloride.

5. A dispersion of claim 2 wherein monomer b2) is 0 to 5% of comonomer phase.

6. A dispersion of claim 2 wherein there is no emulsifier present.

7. A dispersion of claim 2 wherein less than 20% by weight of the particles exceed 1000 nm.

8. A dispersion of claim 2 wherein the polydispersion index is at most 1.3.

* * * * *